United States Patent [19]

Hale

[11] Patent Number: 5,137,206
[45] Date of Patent: Aug. 11, 1992

[54] REUSABLE RECYCLICABLE FIBER DRUM

[75] Inventor: James A. Hale, Red Bank, N.J.

[73] Assignee: Greif Bros. Corporation, Delaware, Ohio

[21] Appl. No.: 779,364

[22] Filed: Oct. 17, 1991

[51] Int. Cl.$^5$ ............................................. B65D 3/16
[52] U.S. Cl. ................................... 229/5.5; 220/408; 220/460
[58] Field of Search ............... 220/408, 410, 403, 420, 220/460, 404, 5.6, 5.7,

[56] References Cited

U.S. PATENT DOCUMENTS

| | | | |
|---|---|---|---|
| 2,033,888 | 3/1936 | LaBombard | 229/5.5 |
| 2,771,221 | 11/1956 | Hammond et al. | 220/460 |
| 2,782,956 | 2/1957 | Richman | 220/408 |
| 2,811,455 | 10/1957 | Erekson | 229/5.5 |
| 2,814,414 | 11/1957 | Nallinger . | |
| 2,849,144 | 8/1958 | Southwell | 220/460 |
| 2,865,552 | 12/1958 | Sider et al. . | |
| 3,937,392 | 2/1976 | Swisher . | |
| 3,982,681 | 9/1976 | Graves et al. | 220/410 |
| 4,396,113 | 8/1983 | Gail et al. . | |
| 4,428,500 | 1/1984 | Kohler | 220/410 |
| 4,471,900 | 9/1984 | Kadance | 229/5.5 |
| 4,666,041 | 5/1987 | Gordon . | |
| 4,700,867 | 10/1987 | Dutt et al. . | |
| 4,742,951 | 5/1988 | Kelly et al. . | |
| 4,997,125 | 3/1991 | Glerum | 220/460 |
| 5,022,553 | 6/1991 | Pontius . | |

Primary Examiner—Stephen Marcus
Assistant Examiner—Christopher McDonald

[57] ABSTRACT

A fiber drum and the method of making the same having a detachable lining fabricated therewith but removable therefrom after a first use to allow for the reuse or recycling of the drum.

5 Claims, 4 Drawing Sheets

REUSABLE RECYCLICABLE FIBER DRUM

BACKGROUND OF THE INVENTION

1. Field of Invention

This invention relates to a drum used for transporting goods, and more particularly to a fiber drum for containing material including liquid or semi-liquid materials which is reusable and/or recyclicable.

2. Description of Prior Art

Cylindrical containers such as drums have been used for a long time as a means of storing or transporting a variety of materials including powdery or granular solids, or liquids and semi liquids. These containers are built to withstand the exigencies of transit. The materials stored in them are removed by first removing the top of the containers and then pouring or pumping the materials out.

Drums are sometimes used to store so-called semi-liquid materials such as adhesives, lubricants, hazardous material or other material that would contaminate or leave contaminants on or in the interior surface thereof. Such drums are normally used once and then discarded since the interior has become contaminated with the material it contained. Disposal and even recycling of such drums because of this is difficult. It has become desirable to provide drums however that may be reused or subject to recycling. The use of the plastic lined fiber drum although found to be permanently satisfactory in many applications suffers certain draw backs.

First, the drum is typically made of a plurality of fiber laminations glued together with the coating bonded to the inner most layer. This inner most layer, depending upon the application, may be plain kraft, foil covered, parchment-covered, silicone treated, waxed or other types of treatment depending upon the product to be shipped. In view of the shipped material contaminating the interior surface of the inner portion such recycling is difficult since the liner must be recycled separately from that of the fiber board. This makes the processing of recycling the fiber drum not only difficult but relatively unmanageable since the drum must either be processed separately or the liner removed.

As to the reusable nature of the lined drum, often times a certain amount of the contents either binds with or migrates into the liner. This may involve a toxic or hazardous material. Accordingly, the chemicals bound to the liner or which have migrated therein may serve to render reuse impossible or otherwise contaminate the contents of the drum upon reuse.

OBJECTIVES AND SUMMARY OF THE INVENTION

It is therefore a principle object of the invention to provide for a fiber drum which is reusable and/or constructed as such that facilitates recycling.

It is further object to provide for a container which is readily convertible from its use with one material to its use in a different application.

Other objectives and advantages of the invention shall become apparent in the description of the invention.

The above objectives are attained by a drum having a straight fiber sidewall, neck portion and a re-enforcing ring which at least at one end is mounted on said neck. The drum is formed with a special liner which becomes the removable element. In this regard, the drums fabrication starts with a sheet of fiber or kraft placed around a mandrel and held in place by vacuum. This sheet may be plain, foil covered, parchment covered etc. as aforesaid depending upon its compatibility with the contents. To this is added one or more layers of paper which is cut and ironed down. About this unglued fiber drum paper is added. After one full lamination of unglued paper is added around the thin first shell glue is applied with additional laminations added until a conventional 10 or 11 lamination shell is fabricated. Chimes are placed on the top and bottom and covers fastened. The drum can now be used to contain a wide variety of material. If after use the end user wishes to reuse the drum for a different product etc. the top and bottom covers are removed and replaced. To remove the plastic lining, a knife may be used inside the top and bottom chime to cut through the layers attached to the lining, usually one or two. It is now possible to lift out the lining since these layers are not glued to the remaining ones and may be disposed of. The covers which may be similarly lined with a removable portion which is stripped therefrom particularly the bottom cover which may be permanently affixed to the side wall and or replaced depending upon the type of drum and the manner the covers are affixed. The drum could now be used for some other purpose. If the drum is to be recycled into fiber board again, the metal chime at the top can be stripped off the bottom pushed out, and the bottom chime could be removed. The contaminated inner portion can then be stripped off with this small percentage of the entire drum disposed of within hazardous material regulations with the remainder sent for recycling.

BRIEF DESCRIPTION OF THE DRAWINGS

Thus by the present invention, its objects and advantages will be realized, the description of which should be taken in conjunction with the drawings wherein.

DETAILED DESCRIPTION OF THE PREFERRED EMBODIMENT

Figure 1:
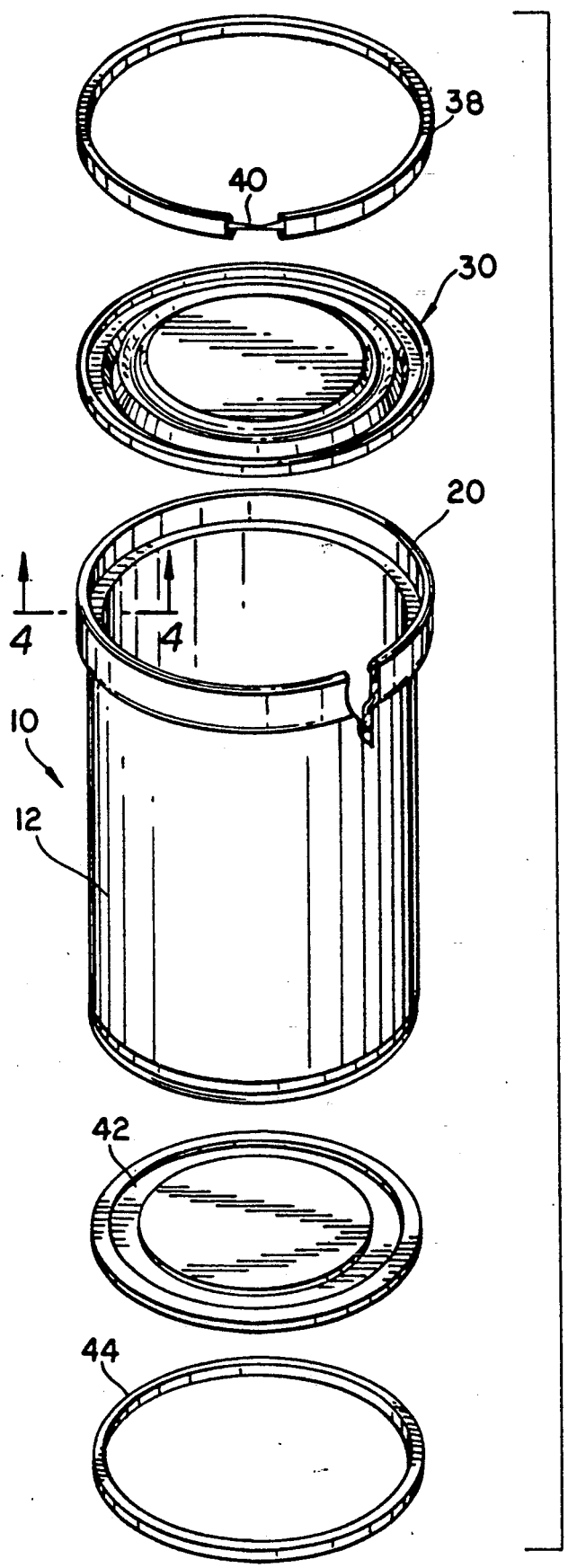
FIG. 1 shows exploded view of a drum constructed in accordance with the invention.

Turning now more particularly to the drawings, as illustrated in FIG. 1, drum 10 comprises a convolutely wound cylindrical shell 12 which is made out of fiber. At its upper end, the shell is continuously connected with a neck 14 (see FIG. 2) comprising a substantially horizontal rim 15 and a vertical sidewall 16. The shell may be preformed or the upper end may be formed after a uniform cylindrical shell is formed.

Figure 2A:
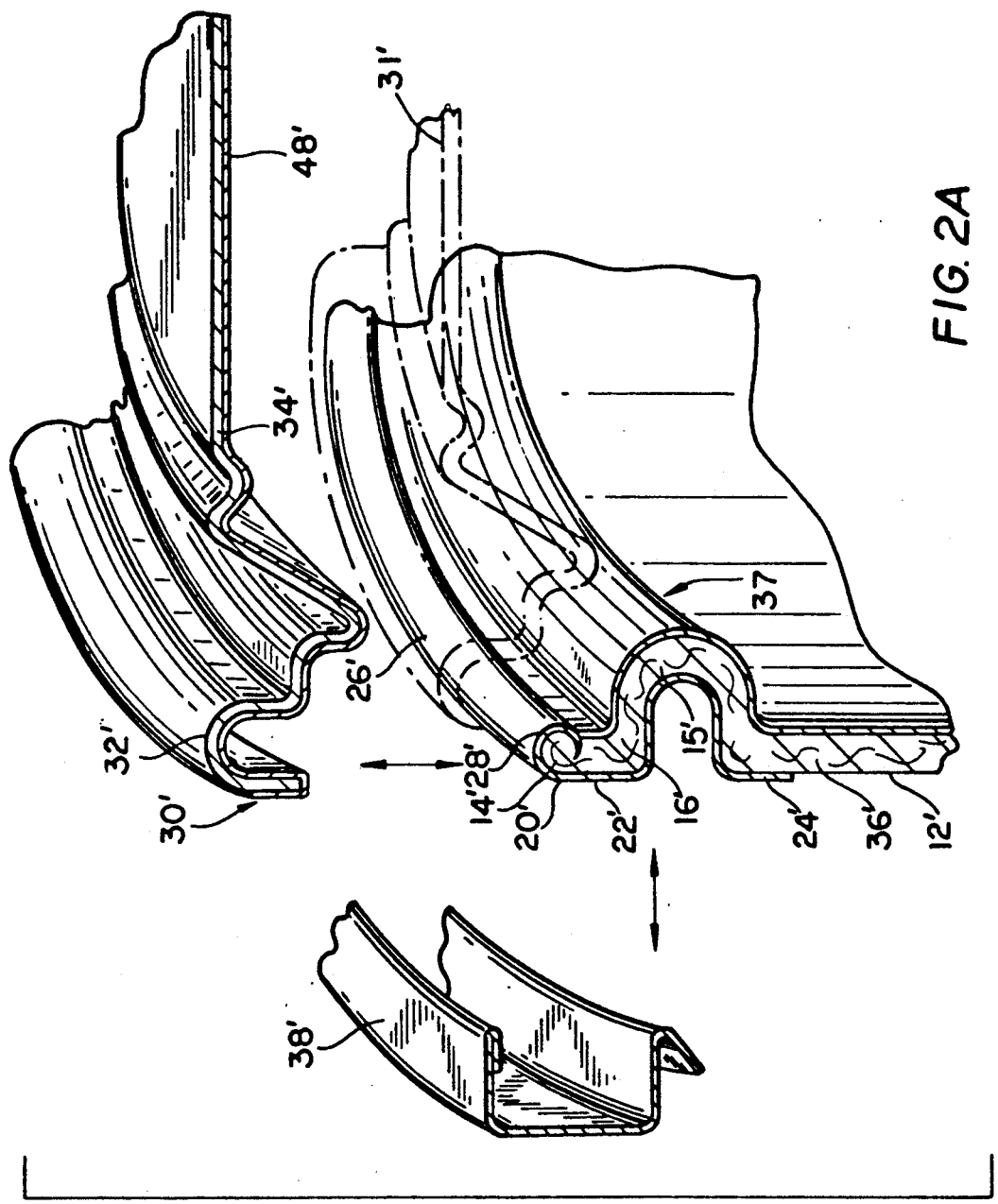
FIG. 2A is a partial side sectional view of the top of a drum having a different construction.
Figure 2:
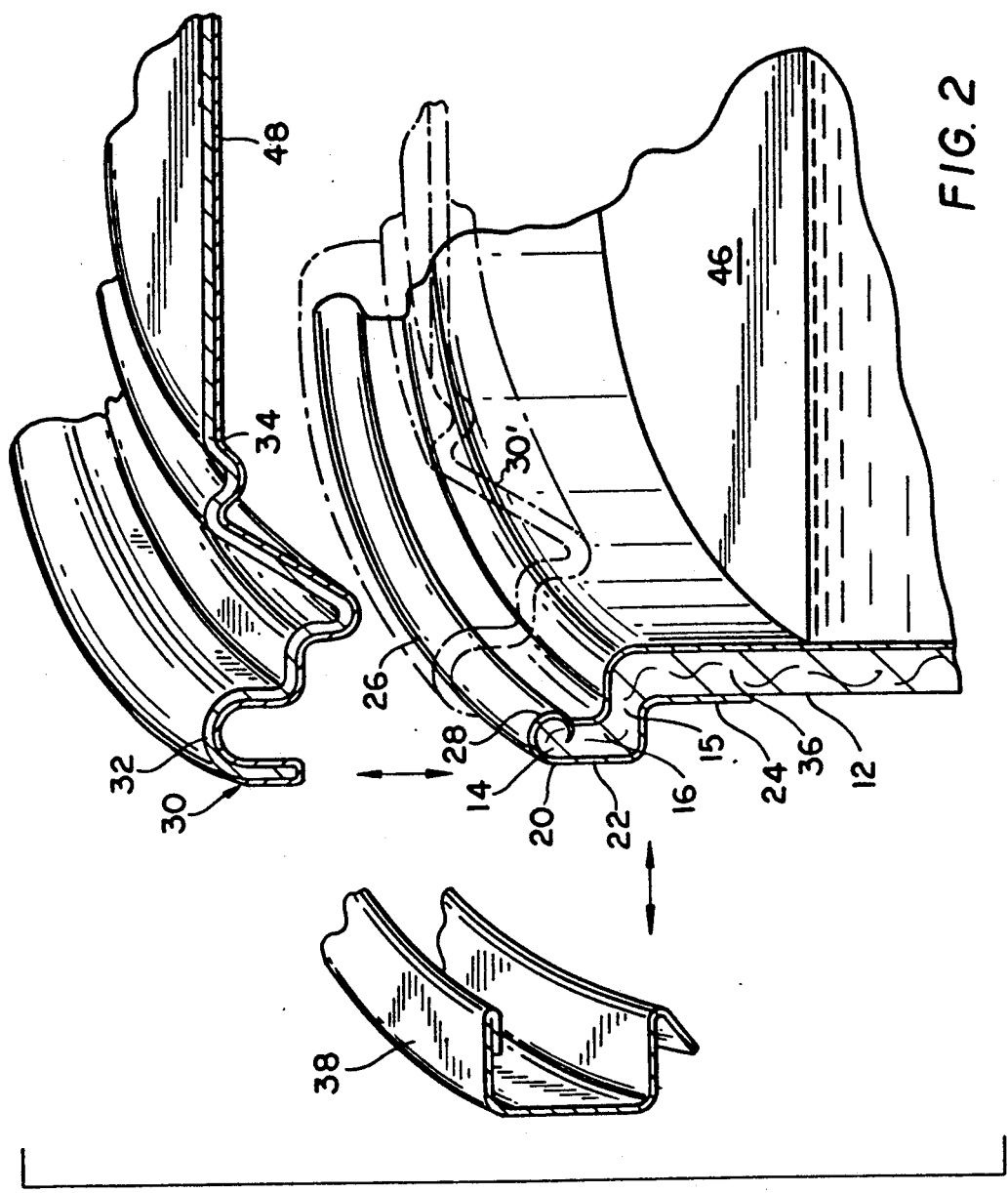
FIG. 2, is a partial side sectional view of the top of the drum.

FIG. 2 illustrates one version of a drum top construction is shown which is useful when using a plunger device (eg. U.S. Pat. No. 3,412,903 to Van Riper Jr.) to empty the drum. It should be noted that this version is used merely as an example. In this regard a top chime 20 is formed from a metal strip of suitable dimensions and thickness which is joined at the ends. The chime is coated at least on its outer surface with a suitable rustresistant material. The chime 20 includes an outer wall 22 which follows the contour of neck 12 so that at its lower portion 24 it is coextensive with the main sidewall of shell 12. The chime also has a top ring 26 which is curled over the top lip 28 of the neck as shown.

The drum 10 is also provided with preformed or molded fiber drum cover 30. Drum cover 30 has an outer rim 32 which has a substantially semicircular cross-section to conform to the chime ring 26. In addition, the drum cover is also provided with a substantially axially oriented cylindrical wall 34 disposed radially inwardly from outer rim 32. This inner wall has an outer surface dimensioned to conform to inner wall 36 of the shell 12. Thus, as the drum cover 30 is placed on drum shell (as indicated in phantom lines 31 in FIG. 2) a double seal is formed between the drum cover 30 and the shell 12: one between rim 32 and ring 26 and a second between walls 36 and 34.

The cover 30 may be affixed to the drum shell by a lock rim 38 (FIG. 1) which includes locking means 40 to tighten the rim after it has been positioned on the shell thereby securing the cover 30 to shell 12.

Figure 3:
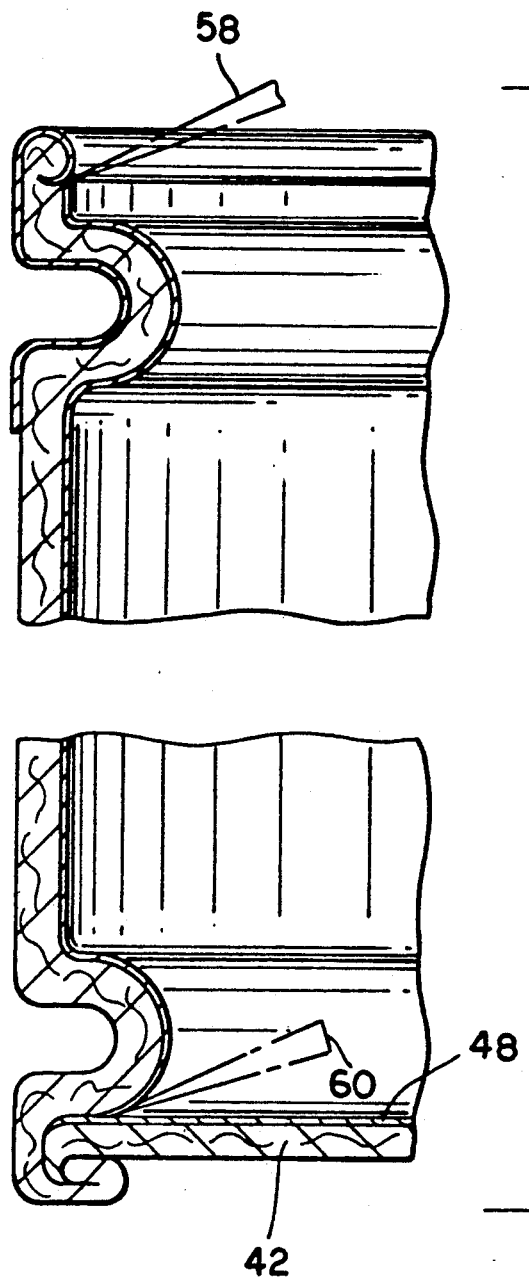
FIG. 3, shows a partial sectional view of a side wall and bottom of a drum.

Preferably, the drum includes a second drum cover 42 which is secured to the bottom of the shell 12 by a second lock rim 44 (see FIG. 1). Alternatively, the second cover 42 may be permanently attached to the shell bottom in the normal manner as shown in FIG. 3.

As to FIG. 2A, this shows a top construction of the drum 10 and cover 30 that different from that shown in FIG. 2 and again is shown for illustration. Like parts have been similarly been numbered and designated with a prime. The chime 20' in this construction includes a portion that is bent in at 37 rather then the smooth transition shown in FIG. 2. In both constructions, a smooth uninterrupted interior wall 36 is provided below the neck portion.

After the shell has been fitted with a bottom cover, it is filled with a material 46 as shown in FIG. 2. After filling, the drum cover is fitted with the top cover 30 and is ready for storage or shipping.

In order to unload the drum, cover 30 is removed by opening the lock 40 and lifting lock rim 38. The material 46 is then removed by a variety of means.

Turning now more particularly to the fabrication of shell 12 and cover 42, the inner portion 48 may comprise a combination of fiber layers plus plastic or can be plain kraft, foil covered, parchment covered, silicone treated, waxed or any other treatment or barrier coating suitable for purpose. For purposes of illustration, a three layered construction is shown. In this regard, a silicone treated plastic covered sheet 50 of fiber placed around a typical forming mandrel and held in place by a typical vacuum system. One or two layers of paper 52 and 54 or kraft are wound around and the paper layers 52 and 54 are cut and iron down, creating a very thin two or three lamination fiber drum shell. To this is added unglued fiber drum paper material with its leading edge taped down to this thin shell, which is positioned on the mandrel. After wrapping one full lamination of unglued paper around the thin first shell, glue is applied and layers added to create the typical 10 or 11 lamination shell. These additional layers are generally indicated by the numeral 56. The result is that the shell 12 comprises approximately three layers, the inner most of which may be coated as aforesaid, which are glued together to create a plastic liner. In addition the shell 12 includes approximately nine layers of kraft which are glued together but not glued to the liner. The covers 30 and particularly bottom cover 42 will include a similarly constructed inner portion or lining as shown in FIGS. 2 and 3.

The chimes 20 are then placed on the top and the bottom with covers 30 and 42 placed on the drum. Again cover 42 may be permanently affixed to the side wall as shown in FIG. 3.

When the contents of the drum are depleted, the inside surface of the drum is still contaminated with the material previously contained therein. Depending on the particular construction of the inner portion, this itself would contain plastic or the other coating material used. The user however can take the following steps to render the drum reusable and/or facilitate recycling.

In this regard, a very sharp knife 58 is applied to cut through the layers of fiber right up against the curled inwardly portion of the metal chime 20. The knife 58 cuts just through the three or so layers making up the lining as the drum is rotated. At the bottom, knife 60 cuts through to remove the inner portion 48 of both the side wall and the inner portion of bottom cover 42. Once this has been freed, the thin shell may be disengaged from the rest of the side wall and bottom since the remaining laminations 56 were not glued to layers 48. What remains when the liner is removed is a drum shell with a plain, clean, uncontaminated interior, which can be made into a new fiber drum by the addition of a new top cover. Alternatively, in addition to removing the plastic lining, the chime can be stripped off the top of the drum, the bottom pushed out and the bottom chime removed. The interior portion of the side wall and bottom are removed and disposed of with the remaining shell subject to recycling into fiber board with the lining disposed of separately.

Thus by the present invention, its objects and advantages are realized and although a preferred embodiment has been disclosed and described in detail herein, its scope should not be limited thereby, rather its scope should be determined by that of the appended claims.

What is claimed is:

1. A reusable drum comprising:
    a fiber cylindrical shell having a cylindrical side wall, open ends and an internal surface, said shell comprising a first portion having said internal surface and a second portion comprising a plurality of layers laminated together, said first portion remaining unlaminated to said second portion;
    a metallic chime secured to said ends; and
    wherein by cutting through the first portion adjacent said chimes allows for the removal of said first portion from the shell with the second portion then comprising the shell.

2. The drum in accordance with claim 1 wherein said first portion comprises a coated lining and at least one layer of kraft laminated therewith to provide a thin coated shell.

3. The drum in accordance with claim 1, wherein said first portion is coated with a substantially impervious material such as plastic, foil, parchment, silicone or wax.

4. The drum in accordance with claim 1, wherein said drum includes a bottom cover having a coated surface.

5. The drum in accordance with claim 1 wherein said shell having said first portion is adapted to contain a liquid or semiliquid material and wherein when said first portion is removed it is adapted to contain a non-liquid.

* * * * *

UNITED STATES PATENT AND TRADEMARK OFFICE
CERTIFICATE OF CORRECTION

Page 1 of 3

PATENT NO. : 5,137,206
DATED : August 11, 1992
INVENTOR(S) : James A. Hale

It is certified that error appears in the above-indentified patent and that said Letters Patent is hereby corrected as shown below:

The title page, showing an illustrative figure, should be deleted and substitute therefor the attached title page.

Figure 4:
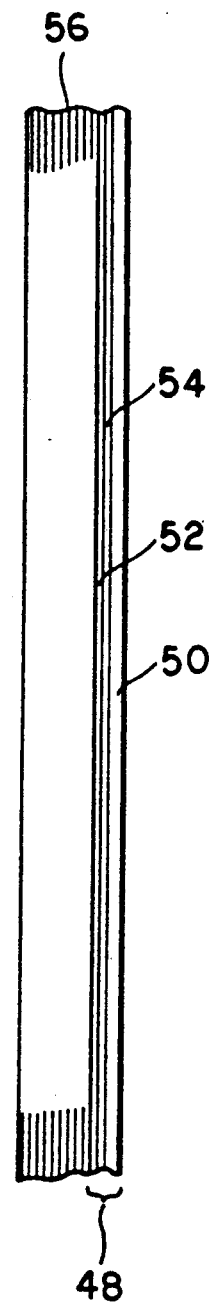
FIG. 4, shows an enlarged sectional view of the sidewall of the drum constructed in accordance with the invention.

In the drawings, sheets 4 of 4, Figures 3 and 4 should appear as shown on the attached page.

Signed and Sealed this

Fifth Day of April, 1994

Attest:

BRUCE LEHMAN

Attesting Officer

Commissioner of Patents and Trademarks

United States Patent [19]
Hale

[11] Patent Number: 5,137,206
[45] Date of Patent: Aug. 11, 1992

[54] REUSABLE RECYCLICABLE FIBER DRUM

[75] Inventor: James A. Hale, Red Bank, N.J.

[73] Assignee: Greif Bros. Corporation, Delaware, Ohio

[21] Appl. No.: 779,364

[22] Filed: Oct. 17, 1991

[51] Int. Cl.⁵ .................................................. B65D 3/16
[52] U.S. Cl. ..................................... 229/5.5; 220/408; 220/460
[58] Field of Search .......... 220/408, 410, 403, 420, 220/460, 404, 5.6, 5.7

[56] References Cited

U.S. PATENT DOCUMENTS

| | | | |
|---|---|---|---|
| 2,033,888 | 3/1936 | LaBombard | 229/5.5 |
| 2,771,221 | 11/1956 | Hammond et al. | 220/460 |
| 2,782,956 | 2/1957 | Richman | 220/408 |
| 2,811,455 | 10/1957 | Erekson | |
| 2,814,414 | 11/1957 | Nallinger | 229/5.5 |
| 2,849,144 | 8/1958 | Southwell | 220/460 |
| 2,865,552 | 12/1958 | Sider et al. | |
| 3,937,392 | 2/1976 | Swisher | |
| 3,982,681 | 9/1976 | Graves et al. | 220/410 |
| 4,396,113 | 8/1983 | Gail et al. | |
| 4,428,500 | 1/1984 | Kohler | 220/410 |
| 4,471,900 | 9/1984 | Kadance | 229/5.5 |
| 4,666,041 | 5/1987 | Gordon | |
| 4,700,867 | 10/1987 | Dutt et al. | |
| 4,742,951 | 5/1988 | Kelly et al. | |
| 4,997,125 | 3/1991 | Glerum | 220/460 |
| 5,022,553 | 6/1991 | Pontius | |

Primary Examiner—Stephen Marcus
Assistant Examiner—Christopher McDonald

[57] ABSTRACT

A fiber drum and the method of making the same having a detachable lining fabricated therewith but removable therefrom after a first use to allow for the reuse or recycling of the drum.

5 Claims, 4 Drawing Sheets

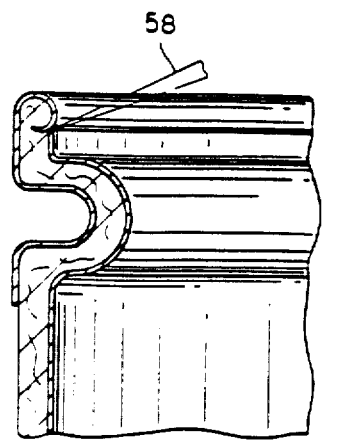

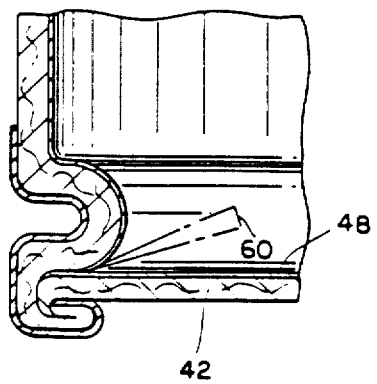

FIG. 3

UNITED STATES PATENT AND TRADEMARK OFFICE
CERTIFICATE OF CORRECTION

PATENT NO. : 5,137,206　　　　　　　　　Page 3 of 3
DATED : Aug. 11, 1992
INVENTOR(S) : James A. Hale It is certified that error appears in the above-identified patent and that said Letters Patent is hereby corrected as shown below:

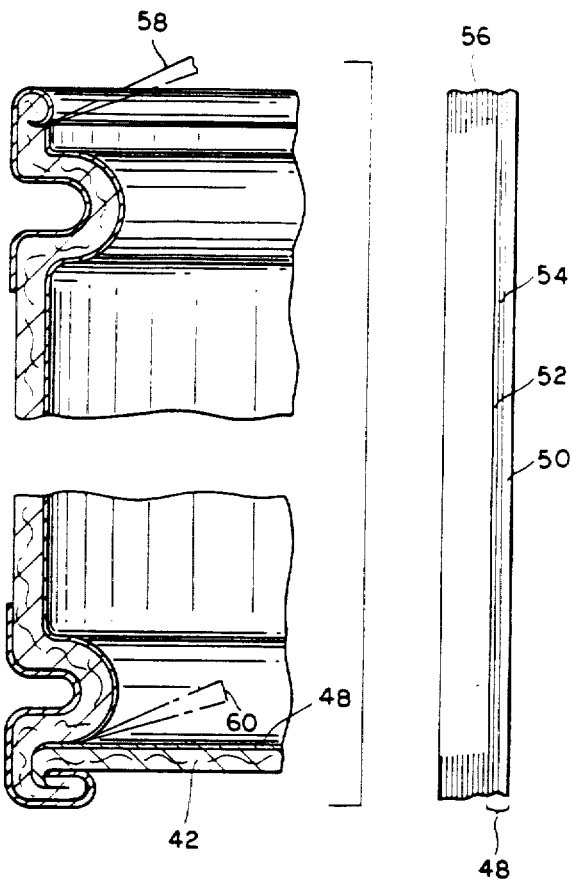

FIG. 3　　　　　FIG. 4